(12) United States Patent
Yui et al.

(10) Patent No.: US 9,196,911 B2
(45) Date of Patent: *Nov. 24, 2015

(54) FUEL CELL GAS DIFFUSION LAYER INTEGRATED GASKET

(75) Inventors: Hajime Yui, Kanagawa-Ken (JP); Shigeru Watanabe, Kanagawa-Ken (JP); Kenichi Oba, Kanagawa-Ken (JP)

(73) Assignee: NOK CORPORATION, Tokyo (JP)

( * ) Notice: Subject to any disclaimer, the term of this patent is extended or adjusted under 35 U.S.C. 154(b) by 804 days.

This patent is subject to a terminal disclaimer.

(21) Appl. No.: 12/821,992

(22) Filed: Jun. 23, 2010

(65) Prior Publication Data

US 2011/0014541 A1   Jan. 20, 2011

(30) Foreign Application Priority Data

Jul. 17, 2009 (JP) .................................. 2009-168653
Sep. 11, 2009 (JP) .................................. 2009-210482

(51) Int. Cl.
  *H01M 8/02* (2006.01)
  *H01M 8/10* (2006.01)

(52) U.S. Cl.
  CPC .......... *H01M 8/0276* (2013.01); *H01M 8/0286* (2013.01); *H01M 8/0297* (2013.01); *H01M 8/1004* (2013.01); *H01M 2008/1095* (2013.01); *Y02E 60/521* (2013.01)

(58) Field of Classification Search
  CPC ... H01M 2/02; H01M 2/0202; H01M 2/0221; H01M 8/00; H01M 8/0284; H01M 8/12; H01M 8/04089; H01M 8/04082; H01M 8/2465; H01M 8/04
  USPC ........................... 429/479–494, 452–471, 400
  See application file for complete search history.

(56) References Cited

U.S. PATENT DOCUMENTS

2004/0234831 A1* 11/2004 Kobayashi et al. ............. 429/30
2010/0239953 A1*  9/2010 Gerding ........................ 429/512

FOREIGN PATENT DOCUMENTS

CA        2641642 A1 *  8/2007
JP        2004-335453 A   11/2004

* cited by examiner

*Primary Examiner* — Patrick Ryan
*Assistant Examiner* — Aaron Greso
(74) *Attorney, Agent, or Firm* — Daniel J. Sepanik, Esq.; Harness, Dickey & Pierce, P.L.C.

(57) ABSTRACT

A gas diffusion layer-integrated gasket 1 includes a first gasket 12 which is integrally molded to a periphery of a first gas diffusion layer 11 and a second gasket 14 which is integrally molded to a periphery of a second gas diffusion layer 13, and a hinge part 15 which connects the first gasket 12 and second gasket 14 to each other. The first and second gas diffusion layers sandwich a membrane-electrode assembly 2 in which catalytic electrode layers are provided on both surfaces of an electrolytic membrane from both sides, wherein a seal protrusion 12c is formed on a surface which is in tight contact with the membrane-electrode assembly 2.

2 Claims, 8 Drawing Sheets

FUEL CELL GAS DIFFUSION LAYER INTEGRATED GASKET

CROSS-REFERENCE TO RELATED APPLICATIONS

This application claims the benefit and priority of Japanese Patent Application No. 2009-210482, filed Sep. 11, 2009 and Japanese Patent Application No. 2009-168653, filed Jul. 17, 2009. The entire disclosures of each of the above applications are incorporated herein by reference.

FIELD

The present disclosure relates to a gasket which is integrally provided in a gas diffusion layer and used for sealing reaction gas in a fuel cell.

BACKGROUND

This section provides background information related to the present disclosure which is not necessarily prior art.

In a fuel cell, as shown in FIG. 15, a fuel-cell cell 100, which is the smallest unit that generates power, is constructed by sandwiching a membrane-electrode assembly (MEA) 101, consisting of an electrolytic membrane and catalytic electrode layers (not shown in diagram), on both sides of it with two separators 104 and 105 and two gas diffusion layers (GDLs) 102 and 103.

On both sides of the membrane electrode assembly 101 in the direction of thickness, a first gasket 106 and a second gasket 107 are each made from a rubber-like elastic material (rubber material or synthetic resin material having rubber-like elasticity) are arranged. Also, between one catalytic electrode layer on the membrane electrode assembly 101 and one separator 104 which opposes it, a fuel gas channel 100a, for example, is formed by the first gasket 106, and between the other catalytic electrode layer on the membrane electrode assembly 101 and the other separator 105 which opposes it, an oxidant gas channel 100b, for example, is formed by the second gasket 107.

That is, in this type of fuel cell, in each fuel-cell cell 100, fuel gas (hydrogen) which passes through the fuel gas channel 100a is supplied to one catalytic electrode layer (anode) side of the membrane-electrode assembly 101 via a first gas diffusion layer 102, and oxidant gas (air) which passes through the oxidant gas channel 100b is supplied to the other catalytic electrode layer (cathode) side of the membrane-electrode assembly 101 via a second gas diffusion layer 103, and power is generated by a reaction which is the reverse of electrolysis of water—that is, a reaction in which water is produced from hydrogen and oxygen. Although the electromotive force produced by each fuel-cell cell 100 is small, the required electromotive force can be obtained by stacking a plurality of fuel-cell cells 100 and electrically connecting them in series (for example, refer to patent reference 1).

SUMMARY

This section provides a general summary of the disclosure, and is not a comprehensive disclosure of its full scope or all of its features.

However, in this type of fuel cell, the fact that the first gasket 106 and the second gasket 107 are integrally molded in the membrane-electrode assembly 101 leads to risk of the membrane-electrode assembly 101 being easily damaged by heat during molding, and the fact that the first gasket 106 and the second gasket 107 are integrally molded in the first gas diffusion layer 102 and the second gas diffusion layer 103 leads to the problem that there are many molding steps and parts, and the precision of assembly of the fuel-cell cells 100 tends to be low.

Taking the above points into consideration, the technical problems of the present disclosure are to improve the assembly precision of fuel cells and to obtain good sealing ability.

As means for effectively resolving the above technical problems, a gas diffusion layer-integrated gasket for a fuel cell comprises a first gasket which is integrally molded in a first gas diffusion layer and a rim part thereof, a second gasket which is integrally molded in a second gas diffusion layer and a rim part thereof, and a hinge part which connects the aforementioned first gasket and second gasket to each other, which sandwiches a membrane-electrode assembly in which catalytic electrode layers are provided on both surfaces of an electrolytic membrane from both sides in the direction of thickness, wherein a seal protrusion is formed on a surface which is in tight contact with the aforementioned membrane-electrode assembly on the aforementioned first gasket or second gasket.

Also, the gas diffusion layer-integrated gasket for a fuel cell includes a fitting protrusion on the first gasket and a fitting hole or indentation on the second gasket which can fit with the aforementioned fitting protrusion and is formed at a position symmetrical to the aforementioned fitting protrusion, with the hinge part as the axis of symmetry.

According to the gas diffusion layer-integrated gasket for a fuel cell, because the first gasket and second gasket are connected to each other via a hinge part and are integrally molded in the rim parts of the first gas diffusion layer and second gas diffusion layer, respectively, the number of parts is reduced. And, because the membrane-electrode assembly is sandwiched between the first gas diffusion layer and first gasket and the second gas diffusion layer and second gasket is tightly affixed by the compression force of the seal protrusion formed on the first gasket and second gasket, assembly precision is improved, and furthermore, sealing ability with the membrane-electrode assembly is improved by the compression force of the aforementioned seal protrusion.

According to the gas diffusion layer-integrated gasket for a fuel cell, when the membrane-electrode assembly is sandwiched by the first gasket and second gasket from both sides in the direction of thickness, a fitting protrusion and a fitting hole or fitting indentation, which are formed in positions symmetrical to each other with the hinge part as the axis of symmetry on the first gasket or second gasket, fit together with each other, and as a result, the first gasket and second gasket are mutually positioned with high precision, and therefore, decreased sealing ability due to stacking offset of the first and second gaskets is prevented.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Preferred embodiments of the gas diffusion layer-integrated gasket for a fuel cell pertaining to the present disclosure are described in detail below in reference to the drawings.

Figure 1:
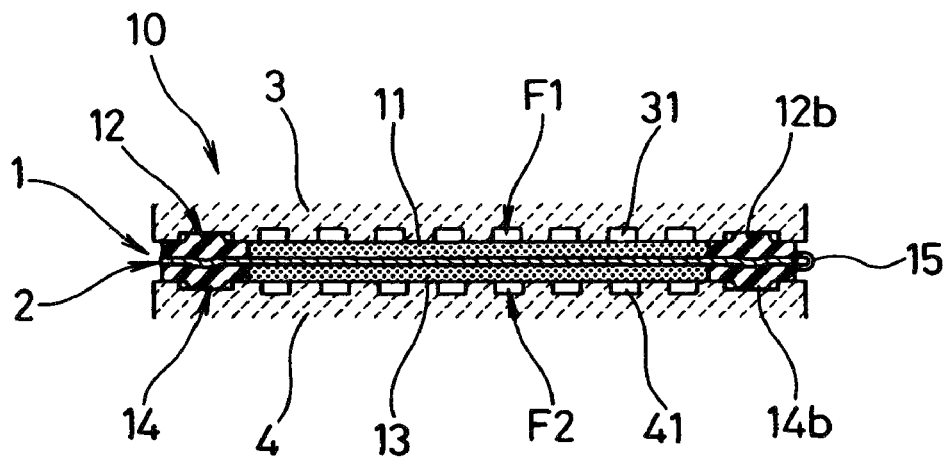
FIG. 1 is a partial cross-sectional view which illustrates a fuel-cell cell comprising a gas diffusion layer-integrated gasket for a fuel cell pertaining to a first embodiment of the present disclosure.

First, FIG. 1 shows a fuel-cell cell comprising a gas diffusion layer-integrated gasket for a fuel cell pertaining to a first embodiment of the present disclosure. In the drawing, reference numeral 1 is a gas diffusion layer-integrated gasket; reference numeral 2 is a membrane-electrode assembly consisting of an electrolytic membrane and catalytic electrode layers provided on both sides of it, which is sandwiched by the gas diffusion layer-integrated gasket 1; reference numerals 3 and 4 are first and second separators arranged such that they sandwich the gas diffusion layer-integrated gasket 1 which sandwiches the membrane-electrode assembly 2.

Figure 2:
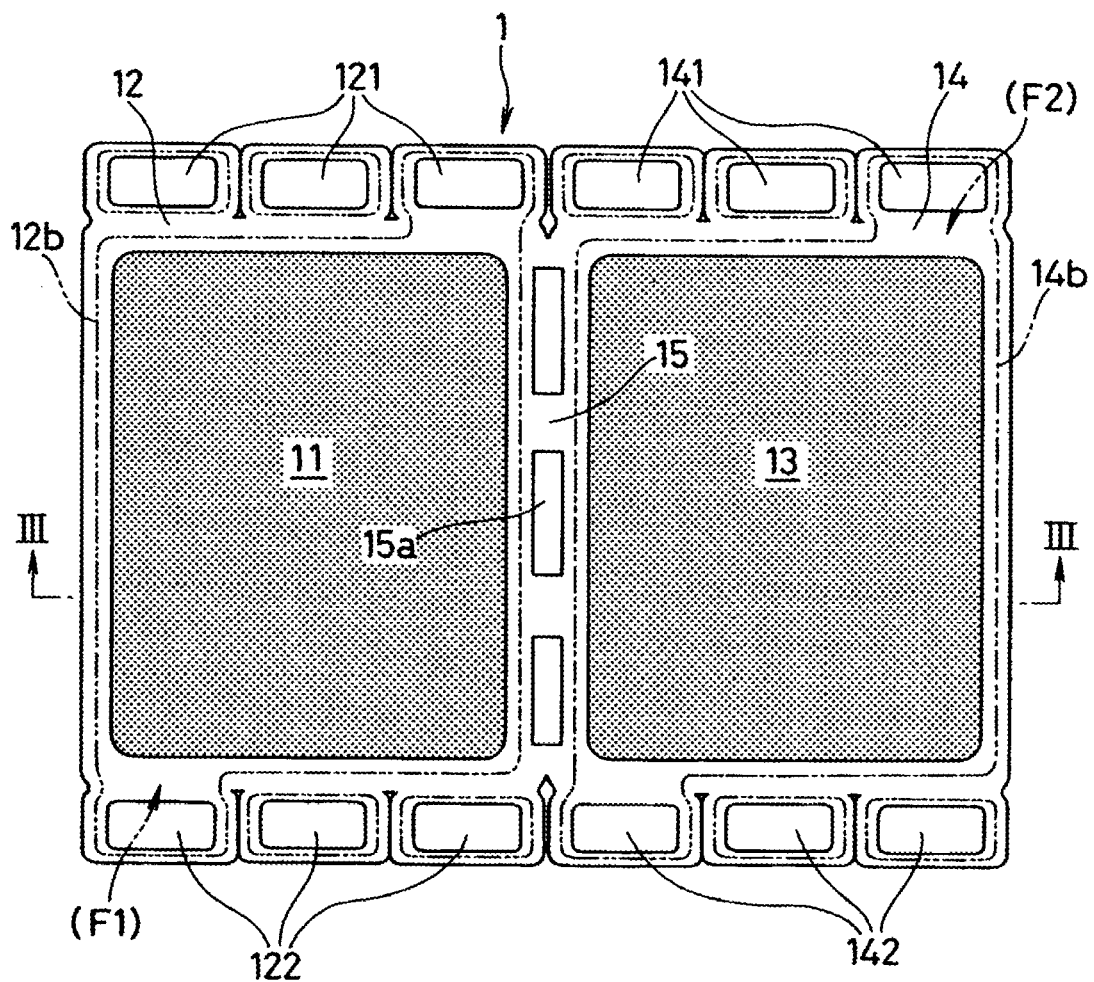
FIG. 2 is a plan view which illustrates a gas diffusion layer-integrated gasket for a fuel cell pertaining to a first embodiment of the present disclosure.
Figure 3:
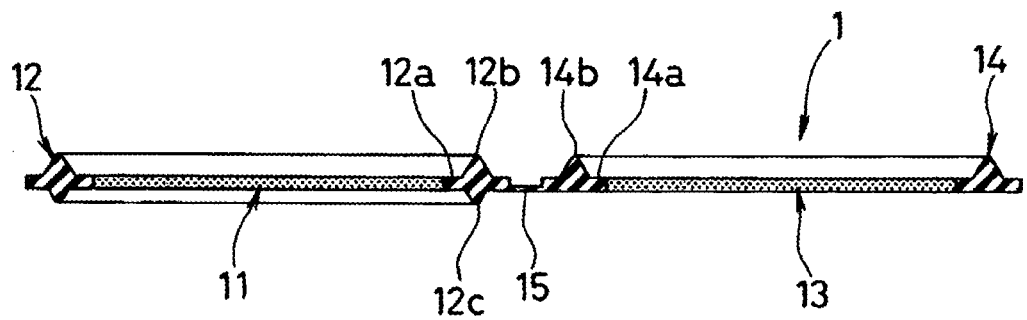
FIG. 3 is a cross-sectional view along line III-III of FIG. 2.

FIG. 2 is a plan view which illustrates a gas diffusion layer-integrated gasket for a fuel cell pertaining to the first embodiment of the present disclosure. FIG. 3 is a cross-sectional view along line III-III of FIG. 2. As shown in FIG. 2 and FIG. 3, the gas diffusion layer-integrated gasket 1 comprises a first gasket 12 which is integrally molded in a first gas diffusion layer 11 and a rim part thereof, a second gasket 14 which is integrally molded in a second gas diffusion layer 13 and a rim part thereof, and a hinge part 15 which connects the two gaskets 12 and 14 to each other.

More specifically, the first gas diffusion layer 11 and second gas diffusion layer 13 in the gas diffusion layer-integrated gasket 1 are formed into plates or sheets of the same size and shape as each other from a metal porous body or a porous material such as carbon fiber, for example.

The first gasket 12 and second gasket 14 in the gas diffusion layer-integrated gasket 1 are made from a material selected from rubber-like elastic materials (rubber material or synthetic resin material having rubber-like elasticity), preferably ethylene propylene rubber (EPDM), silicone rubber (VMQ), fluorine rubber (FKM), perfluoro rubber (FFKM) and the like. They are formed symmetrically to each other with the hinge part 15 as the axis of symmetry, and they respectively have base parts 12a and 14a, which are integrated by impregnation in the rim part of the first gas diffusion layer 11 and second gas diffusion layer 13, and main ribs 12b and 14b, which protrude from one side to form cross-sectional ridges.

That is, the gas diffusion layer-integrated gasket 1 is integrally molded by positioning the first gas diffusion layer 11 and second gas diffusion layer 13 inside a specified mold (not shown in diagram), and then, by tightening the mold, making the liquid molding material fill the cavities formed between the aforementioned first gas diffusion layer 11 and second diffusion layer 13 and the inner surface of the aforementioned mold. Therefore, concerns about the membrane-electrode assembly 2 being damaged by heat, as in the case where the gaskets are integrally molded with the membrane-electrode assembly 2, are eliminated.

Also, on the edges of the first gasket 12, as shown in FIG. 2, a plurality of pairs of manifold holes 121 and 122 are provided, which constitute the respective supply channels and drainage channels of the fuel gas, oxidant gas, coolant and so forth. Similarly, on the edge of the second gasket 14, a plurality of pairs of manifold holes 141 and 142, which constitute the respective supply channels and drainage channels of the fuel gas, oxidant gas, coolant and so forth, are provided in positions having line symmetry with the manifold holes 121 and 122 of the first gasket 12, with the hinge part 15 as the axis of symmetry. The main ribs 12b and 14b divide the fuel gas channels, oxidant gas channels and coolant channels including the manifold holes 121, 122, 141 and 142 so that they are independent from each other, as shown by the double-dotted lines in FIG. 2.

Figure 4A:
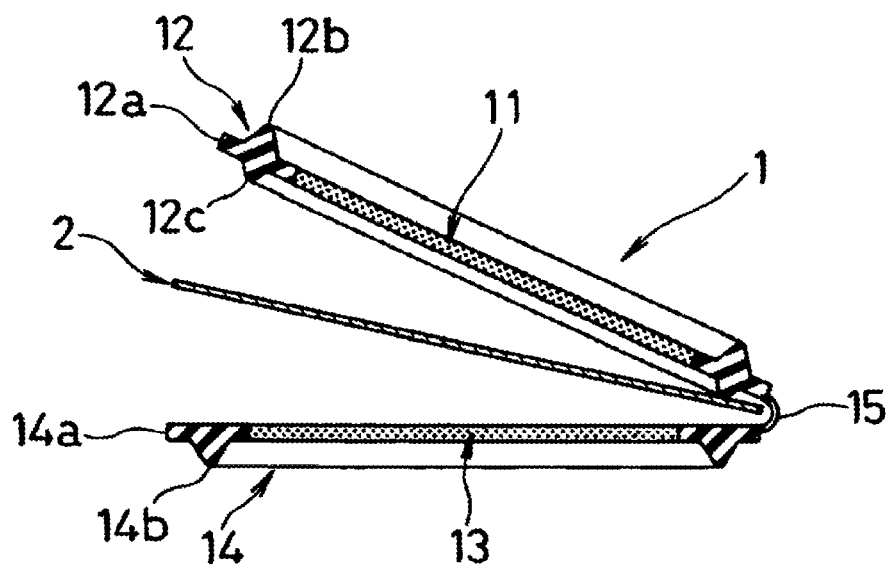
FIGS. 4A and 4B are explanatory diagrams which illustrate the process of sandwiching the membrane-electrode assembly by a gas diffusion layer-integrated gasket for a fuel cell pertaining to a first embodiment of the present disclosure.

On the surface opposite the main rib 12b on the first gasket 12 of the gas diffusion layer-integrated gasket 1—in other words, on the surface which is in tight contact with the membrane-electrode assembly 2 in the stacked state shown in FIG. 1—a seal protrusion 12c having a small cross-sectional area whose protrusion height is lower than the main rib 12b is formed continuously along a position which faces the back of the main rib 12b, as shown in FIG. 3. As shown in FIGS. 3 and 4A, in the uninstalled condition, the second gasket 14 has a planar surface that is in tight contact with the membrane electrode assembly 2 when in the installed state in FIG. 4B.

The hinge part 15 of the gas diffusion layer-integrated gasket 1 is made from a rubber-like elastic material which connects the first gasket 12 and the second gasket 14. It is formed into a membrane shape which is thinner than the base parts 12a and 14a of the first gasket 12 and second gasket 14, such that it can easily bend. Also, the hinge part 15 is made even more easily bendable by a specified number of slits 15a formed in the bending part of the hinge part 15.

Figure 4B:
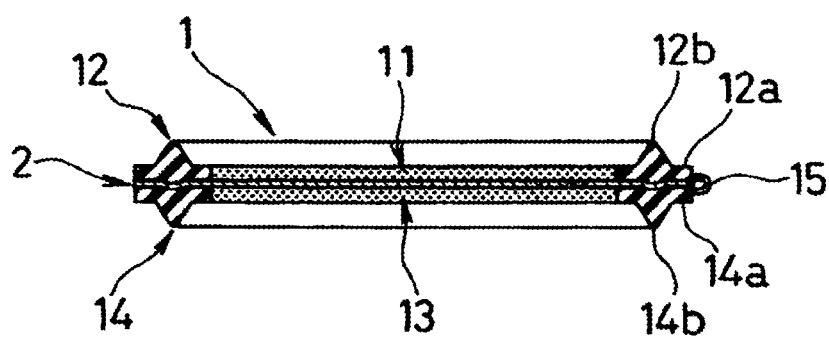
Figure 5:
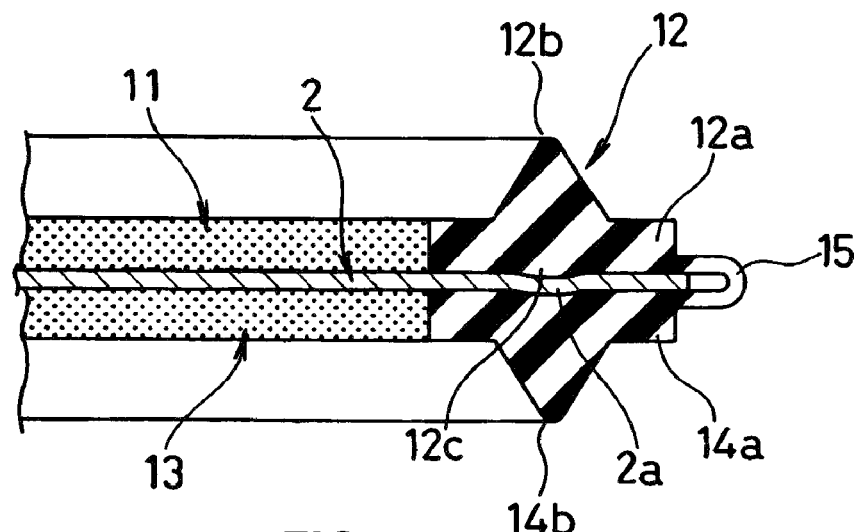
FIG. 5 is a partial cross-sectional view which illustrates the state where the membrane-electrode assembly has been sandwiched by a gas diffusion layer-integrated gasket for a fuel cell pertaining to a first embodiment of the present disclosure.

FIGS. 4A and 4B illustrate the process of sandwiching the membrane-electrode assembly by a gas diffusion layer-integrated gasket pertaining to the first embodiment of the present disclosure, and FIG. 5 illustrates the state where the membrane-electrode assembly has been sandwiched. That is, in the gas diffusion layer-integrated gasket 1 pertaining to the first embodiment of the present disclosure configured as described above, as shown in FIG. 4A, the first gas diffusion layer 11 and first gasket 12 and the second gas diffusion layer 13 and second gasket 14 are folded together via the hinge part 15 such that the main ribs 12b and 14b oppose each other with respect to the direction of thickness, while sandwiching the membrane-electrode assembly 2 from both sides in the direction of thickness, as shown in FIG. 4B. In this state, the manifold holes 121 and 122 of the first gasket 12 and the manifold holes 141 and 142 of the second gasket 14 shown in FIG. 2 overlap each other.

In this case, the seal protrusion 12c formed on the first gasket 12 is in tight contact with the membrane-electrode assembly 2 in the compressed state, and, as shown in FIG. 5, a part 2a of the membrane-electrode assembly 2 pushes on the second gasket 14 due to its compression counterforce. Therefore, the membrane-electrode assembly 2 is firmly sandwiched, and position offset can be prevented, and as a result, the assembly precision of the fuel cell is improved.

Furthermore, the protrusion height and cross-sectional area of the seal protrusion 12c are appropriately set such that, in the stacked state shown in FIG. 1, the membrane-electrode assembly 2 does not incur large bending deformation due to the compression counterforce of the seal protrusion 12c, and the first and second gaskets 12 and 14 and the first and second gas diffusion layers 11 and 13 do not partially rise up from the membrane-electrode assembly 2.

In the gas diffusion layer-integrated gasket 1, because the first gasket 12 and second gasket 14 are connected to each other via a hinge part 15 and they are integrally molded on the respective rim parts of the first gas diffusion layer 11 and second gas diffusion layer 13, the number of parts and the number of assembly steps can be greatly reduced.

In this way, using the gas diffusion layer-integrated gasket 1 which sandwiches the membrane-electrode assembly 2, a fuel-cell cell 10, which is the smallest unit that generates power, is constructed by sandwiching a membrane-electrode assembly 2 with first and second separators 3 and 4.

The first separator 3 is made from an electrically conductive material such as carbon or metal sheet. A groove 31 is formed on the surface opposite the first gas diffusion layer 11 in the gas diffusion layer-integrated gasket 1, and by means of this groove 31, a first reaction gas channel (for example, a fuel gas channel) F1 is formed between the first separator 3 and the first gas diffusion layer 11. The first reaction gas channel F1 is connected to any of the plurality of manifold holes 121 and any of the plurality of manifold holes 122 shown in FIG. 2.

The second separator 4 is similar to the first separator 3. A groove 41 is formed on the surface opposite the second gas diffusion layer 13 in the gas diffusion layer-integrated gasket 1, and by means of this groove 41, a second reaction gas channel (for example, an oxidant gas channel) F2 is formed between the second separator 4 and the second gas diffusion layer 13. The second gas channel F2 is connected to manifold holes 141 and 142, among the plurality of pairs of manifold holes 141 and 142 shown in FIG. 2, which overlap manifold holes 121 and 122 at a position different from the first reaction gas channel F1.

In the stacked state shown in FIG. 1, due to the fact that the main rib 12b of the first gasket 12 in the gas diffusion layer-integrated gasket 1 is in tight contact with the rim part of the first separator 3 in the state where it is compressed with a specified squeeze, the region where the first reaction gas channel F1 is formed is separated so that it is independent. Similarly, due to the fact that the main rib 14b of the second gasket 14 in the gas diffusion layer-integrated gasket 1 is in tight contact with the rim part of the second separator 4 in the state where it is compressed with a specified squeeze, the region where the second reaction gas channel F2 is formed is separated so that it is independent.

Figure 6:
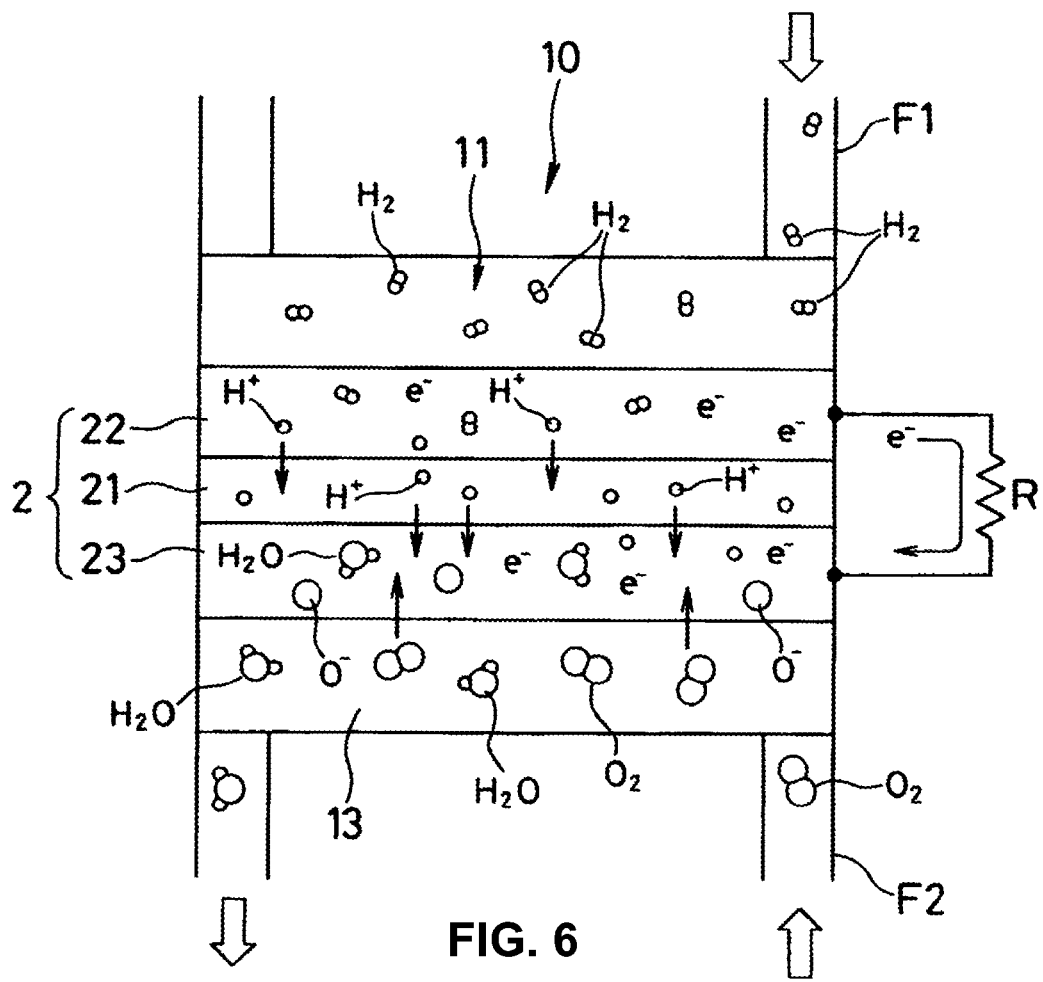
FIG. 6 is an explanatory diagram which schematically illustrates the mechanism of power generation in a fuel-cell cell.

In the fuel-cell cell 10 configured as described above, as shown in FIG. 6, fuel gas containing hydrogen $H_2$, for example, is supplied to one catalytic electrode layer (anode) 22 in the membrane-electrode assembly 2 via the first reaction gas channel F1 and first gas diffusion layer 11, and oxidant gas containing $O_2$ (air), for example, is supplied to the other catalytic electrode layer (cathode) 23 in the membrane-electrode assembly 2 via the second reaction gas channel F2 and second gas diffusion layer 13, and power is generated by an electrochemical reaction which is the reverse of electrolysis of water—that is, a reaction in which water $H_2O$ is produced from hydrogen $H_2$ and oxygen $O_2$.

More specifically, the hydrogen $H_2$ in the fuel gas supplied from the first reaction gas channel F1 to the anode 22 in the membrane-electrode assembly 2 via the first gas diffusion layer 11 is decomposed into electrons $e^-$ and hydrogen ions $H^+$ by the catalytic action of the anode 22.

Then, the electrons e– produced in this way flow as current through an external load R toward the cathode 23 in the membrane-electrode assembly 2. Also, since hydrogen ions $H^+$ produced by dissociation of electrons $e^-$ from hydrogen $H_2$ are attracted to the electrons e– of the cathode 23, they migrate to the cathode 23 via the electrolytic membrane 21 in the membrane-electrode assembly 2.

On the other hand, the oxygen $O_2$ in the oxidant gas supplied from the second reaction gas channel F2 to the cathode 23 in the membrane-electrode assembly 2 via the second gas diffusion layer 13 accepts electrons $e^-$ by the catalytic action of the cathode 23. Then, oxygen ions $O^-$ migrate from the anode 22 via the electrolytic membrane 21 and bond with the arriving hydrogen ions $H^+$, thereby producing water $H_2O$.

Furthermore, although the electromotive force by a single fuel-cell cell 10 is small, a fuel cell is normally constructed by electrically connecting many fuel-cell cells 10 in series by stacking, such that the required electromotive force is obtained.

In this case, fuel gas which flows through the first reaction gas channel F1 is sealed by the main rib 12b of the first gasket 12 which was put in tight contact with the rim part of the first separator 3 with a specified squeeze, and the oxidant gas or produced water which flows through the second reaction gas channel F2 is sealed by the main rib 14b of the second gasket 14 which was put in tight contact with the rim part of the second separator 4 with a specified squeeze.

Also, the seal protrusion 12c formed on the first gasket 12 is put in tight contact with the membrane-electrode assembly 2 in the compressed state, and, as shown in FIG. 5, a part 2a of the membrane-electrode assembly 2 pushes on the second gasket 14 due to its compression counterforce. Therefore, the contact surface pressure of the first and second gaskets 12 and 14 against the membrane-electrode assembly 2 is locally increased. Moreover, the compression counterforce of the first and second gaskets 12 and 14 also effectively contributes to an increase in the contact surface pressure of the first and second gaskets 12 and 14 against the membrane-electrode assembly 2 by the seal protrusion 12c. For this reason, fuel gas to be supplied from the first gas diffusion layer 11 to one catalytic electrode layer 22 in the membrane-electrode assembly 2 does not leak from the contact part between the first gasket 12 and the membrane-electrode assembly 2, and oxidant gas to be supplied from the second gas diffusion layer 14 to the other catalytic electrode layer 23 in the membrane-electrode assembly 2 does not leak from the contact part between the second gasket 14 and the membrane-electrode assembly 2.

Furthermore, in the first embodiment described above, the seal protrusion 12c is formed on the first gasket 12, but the present disclosure is not limited to this configuration, and the seal protrusion 12c may be formed on the side opposite the main rib 14b on the second gasket 14 or on the surface which is in tight contact with the membrane-electrode assembly 2.

Also, in the first embodiment described above, fuel gas is supplied from the first reaction gas channel F1 and oxidant gas is supplied from the second reaction gas channel F2, but these can be reversed.

Figure 7:
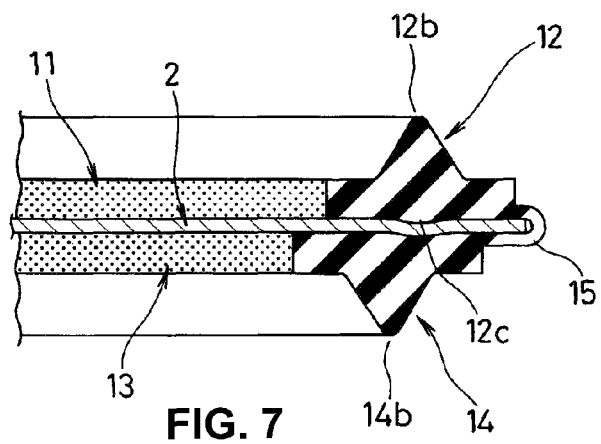
FIG. 7 is a partial cross-sectional view which illustrates the state of position offset when the membrane-electrode assembly is sandwiched by a gas diffusion layer-integrated gasket for a fuel cell pertaining to a first embodiment of the present disclosure.

Furthermore, in the state where the membrane-electrode assembly 2 is sandwiched by the gas diffusion layer-integrated gasket 1, if the first gasket 12 and the second gasket 14 are positionally offset from each other as shown in FIG. 7, the main ribs 12b and 14b also end up being offset from each other. Therefore, in the stacked state shown in FIG. 1, there is the concern that excellent sealing ability will not be obtained, because contact surface pressure against the first and second separators 3 and 4 due to the compression counterforce of the main ribs 12b and 14b is diminished, and moreover, because the compression counterforce of the main ribs 12b and 14b do not effectively act to increase the contact surface pressure of the first and second gaskets 12 and 14 against the membrane-electrode assembly 2 by the seal protrusion 12c.

Figure 8:
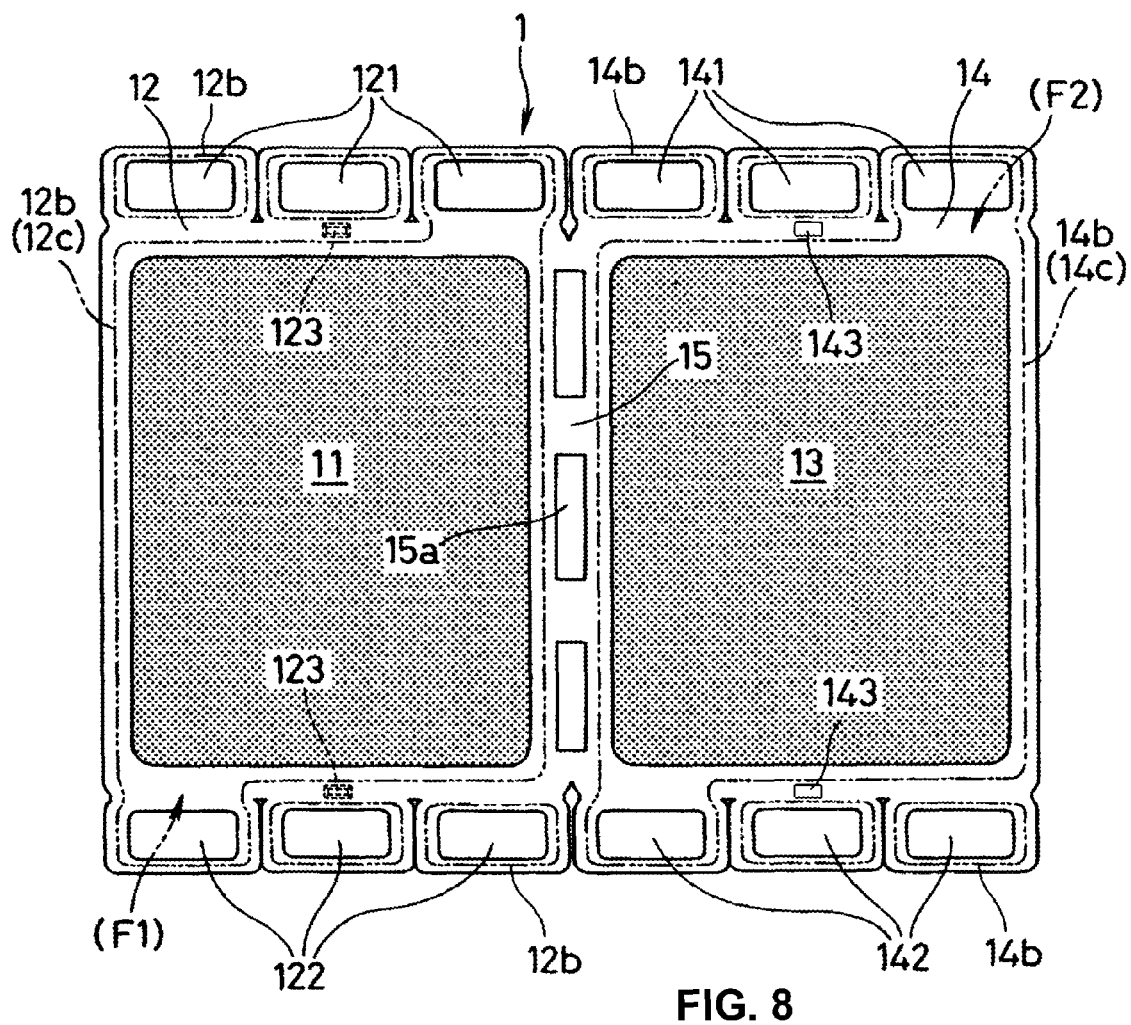
FIG. 8 is a plan view which illustrates a gas diffusion layer-integrated gasket for a fuel cell pertaining to a second embodiment of the present disclosure.

Thus, the second through fifth embodiments of the present disclosure described below are designed to prevent positional offset between the first gasket 12 and the second gasket 14 when they sandwich the membrane-electrode assembly 2. FIG. 8 is a plan view which illustrates a gas diffusion layer-integrated gasket for a fuel cell pertaining to a second embodiment.

That is, in the gas diffusion layer-integrated gasket 1 of the second embodiment, the differences from the first embodiment described previously are that fitting protrusions 123 are formed on the first gasket 12, and a plurality of fitting holes 143 are formed on the second gasket 14. The fitting protrusions 123 and fitting holes 143 are provided at positions having line symmetry with each other, with the center axis of the hinge part 15 as the axis of symmetry. The other portions can be configured basically in the same way as in the first embodiment.

The fitting protrusions 123 in the first gasket 12 rise in a shape of a rectangular solid, and they are formed at positions close to the two mutually parallel sides of the first gas diffusion layer 11 perpendicular to the long direction of the hinge part 15. The fitting holes 143 in the second gasket 15 have an oblong shape which corresponds to the shape of a fitting protrusion 123 projected onto a flat surface, and they are formed at positions close to the two mutually parallel sides of the second gas diffusion layer 13 perpendicular to the long direction of the hinge part 15.

Furthermore, the fitting protrusions 123 protrude from the surface opposite the main rib 12b—that is, the surface which faces the second gasket 14 when folded via the hinge part 15. As shown in FIG. 8, they are positioned outside the seal region (first reaction gas channel F1) surrounded by the main rib 12b (seal protrusion 12c), and in particular, they are positioned between the seal region for the first gas diffusion layer 11 by the main rib 12b and the seal region for the manifold holes 121 and 122. Therefore, the fitting holes 143, which are positioned symmetrically to this, are positioned outside the seal region (second reaction gas channel F2) surrounded by the main rib 14b, and in particular, they are positioned between the seal region for the second gas diffusion layer 13 by the main rib 14b and the seal region for the manifold holes 141 and 142.

Figure 9:
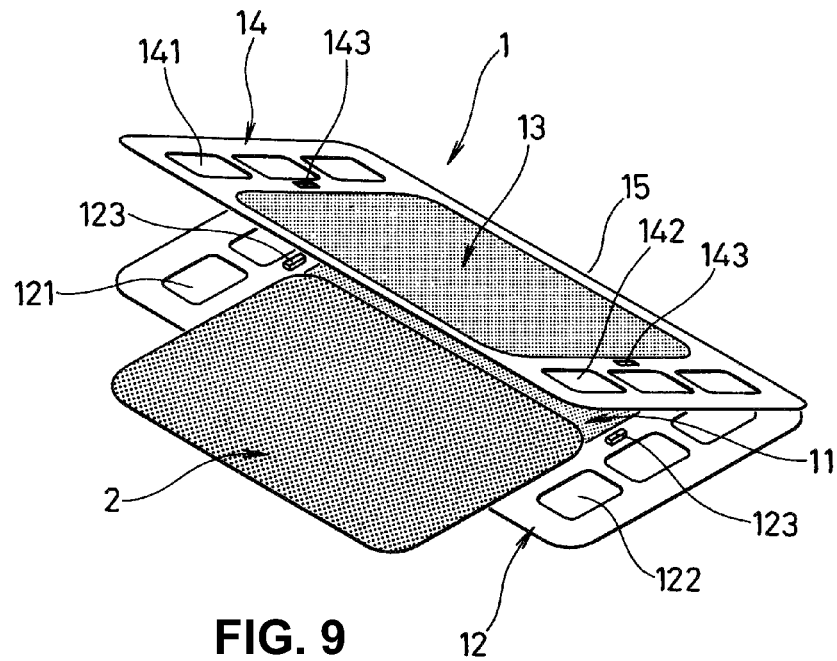
FIG. 9 is a perspective view which illustrates the process of sandwiching the membrane-electrode assembly by a gas diffusion layer-integrated gasket for a fuel cell pertaining to a second embodiment of the present disclosure.
Figure 10:
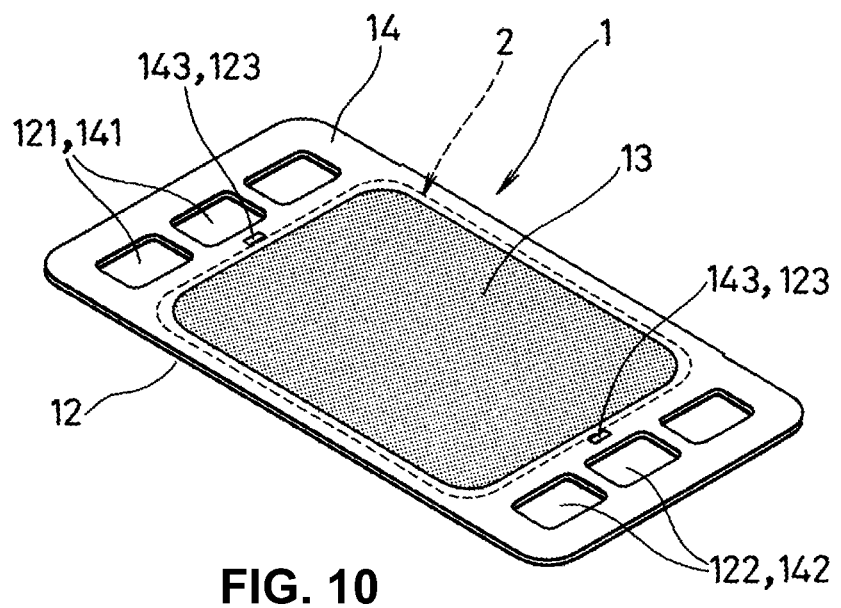
FIG. 10 is a perspective view which illustrates the state where the membrane-electrode assembly has been sandwiched by a gas diffusion layer-integrated gasket for a fuel cell pertaining to a second embodiment of the present disclosure.
Figure 11:
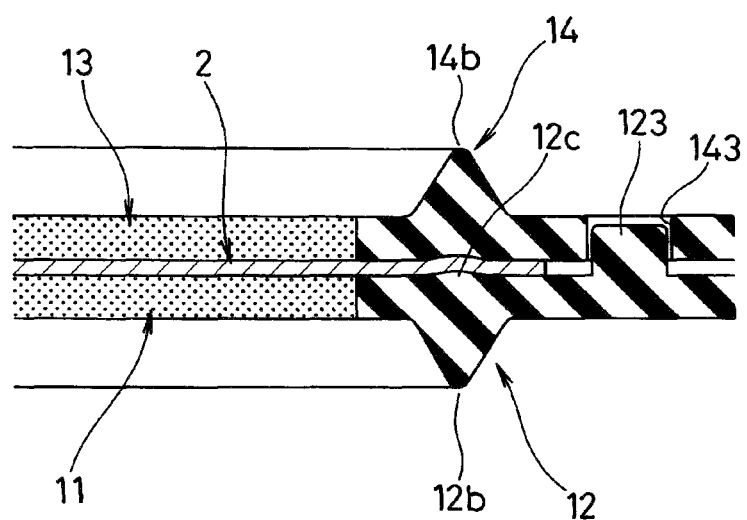
FIG. 11 is a cross-sectional view which illustrates the state of fitting between a fitting protrusion and fitting hole.
Figure 15:
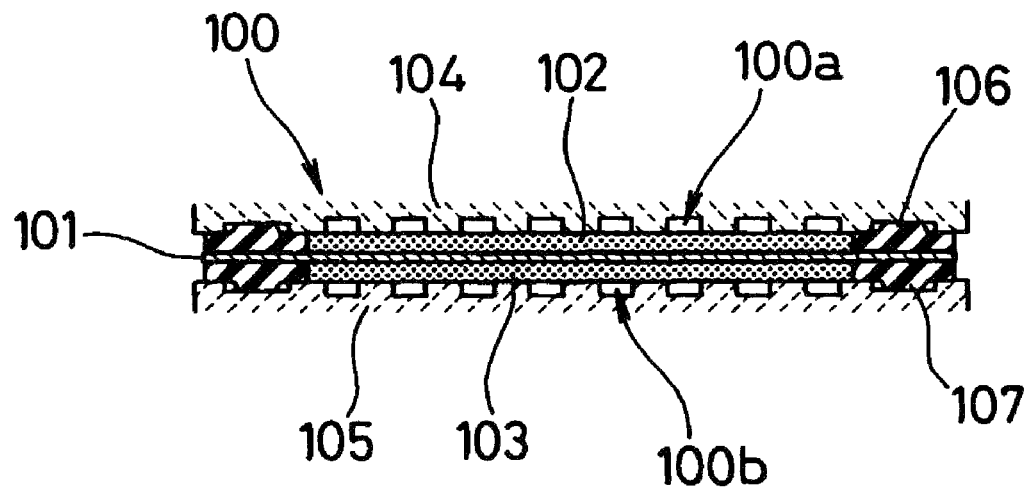
FIG. 15 is a partial cross-sectional view which illustrates a fuel-cell cell comprising a gas diffusion layer-integrated gasket for a fuel cell according to prior art.

FIG. 9 is a perspective view which illustrates the process of sandwiching the membrane-electrode assembly by the gas diffusion layer-integrated gasket for a fuel cell of the second embodiment, FIG. 10 is a perspective view which illustrates the state where the membrane-electrode assembly has been sandwiched by the gas diffusion layer-integrated gasket for a fuel cell of the second embodiment, and FIG. 11 is a cross-sectional view which illustrates the state of fitting between the fitting protrusion and fitting hole. That is, in the gas diffusion layer-integrated gasket 1 pertaining to the second embodiment of the present disclosure configured as described above, as shown in FIG. 9, the first gas diffusion layer 11 and first gasket 12 and the second gas diffusion layer 13 and second gasket 14 are folded together via the hinge part 15 such that the main ribs oppose each other with respect to the direction of thickness, while sandwiching the membrane-electrode assembly 2 from both sides in the direction of thickness. In this state, the manifold holes 121 and 122 of the first gasket 12 and the manifold holes 141 and 142 of the second gasket 14 overlap each other, as shown in FIG. 10.

In this case, the fitting protrusions 123 formed on the first gasket 12 fit together with the fitting holes 143 formed on the second gasket 14. Since the fitting protrusions 123 and the fitting holes 143 are formed at positions which are symmetrical to each other with the hinge part 15 as the axis of symmetry, the first gasket 12 and the second gasket 15 are positioned with high precision due to the fact that the fitting protrusions 123 and the fitting holes 143 fit together, as shown in FIG. 11, and therefore, no offset occurs between the main rib 12b and seal protrusion 12c and the main rib 14b of the second gasket 14. Therefore, in the stacked state of a fuel cell stack, good contact surface pressure against the first and second separators 3 and 4 (refer to FIG. 1) is obtained due to the compression counterforce of the main ribs 12b and 14b, and the compression counterforce of the main ribs 12b and 14b effectively acts to increase the contact surface pressure of the first and second gaskets 12 and 14 against the membrane-electrode assembly 2 by the seal protrusion 12c, and as a result, excellent sealing ability is obtained.

For this reason, the stacking operation of the first gas diffusion layer 11, first gasket 12, membrane-electrode assembly 2, second gas diffusion layer 13 and second gasket 14 can be performed without paying attention to the seal line—that is, without paying attention to whether or not the main rib 12b, seal protrusion 12c and main rib 14b overlap. Therefore, assembly of the fuel-cell cells 10 (refer to FIG. 1) is simple, and operability is improved.

Moreover, before the membrane-electrode assembly 2 is sandwiched between the first gas diffusion layer 11 and first gasket 12 and the second diffusion layer 13 and second gasket 14, the fitting protrusions 123 have the function of guiding the set position of the membrane-electrode assembly 2 on top of the first gas diffusion layer 11 and first gasket 12, and as a result, fuel cell assembly precision can be even further improved.

Also, because the fitting holes 143 are positioned on the outside of the seal region surrounded by the main rib 14b in the second gasket 14, fuel gas and oxidant gas supplied to the anode side and cathode side of the membrane-electrode assembly 2 via the first gas diffusion layer 11 or second gas diffusion layer 13 do not leak out through gaps between the fitting holes 143 and fitting protrusions 123, and they do not get mixed together.

Figure 12:
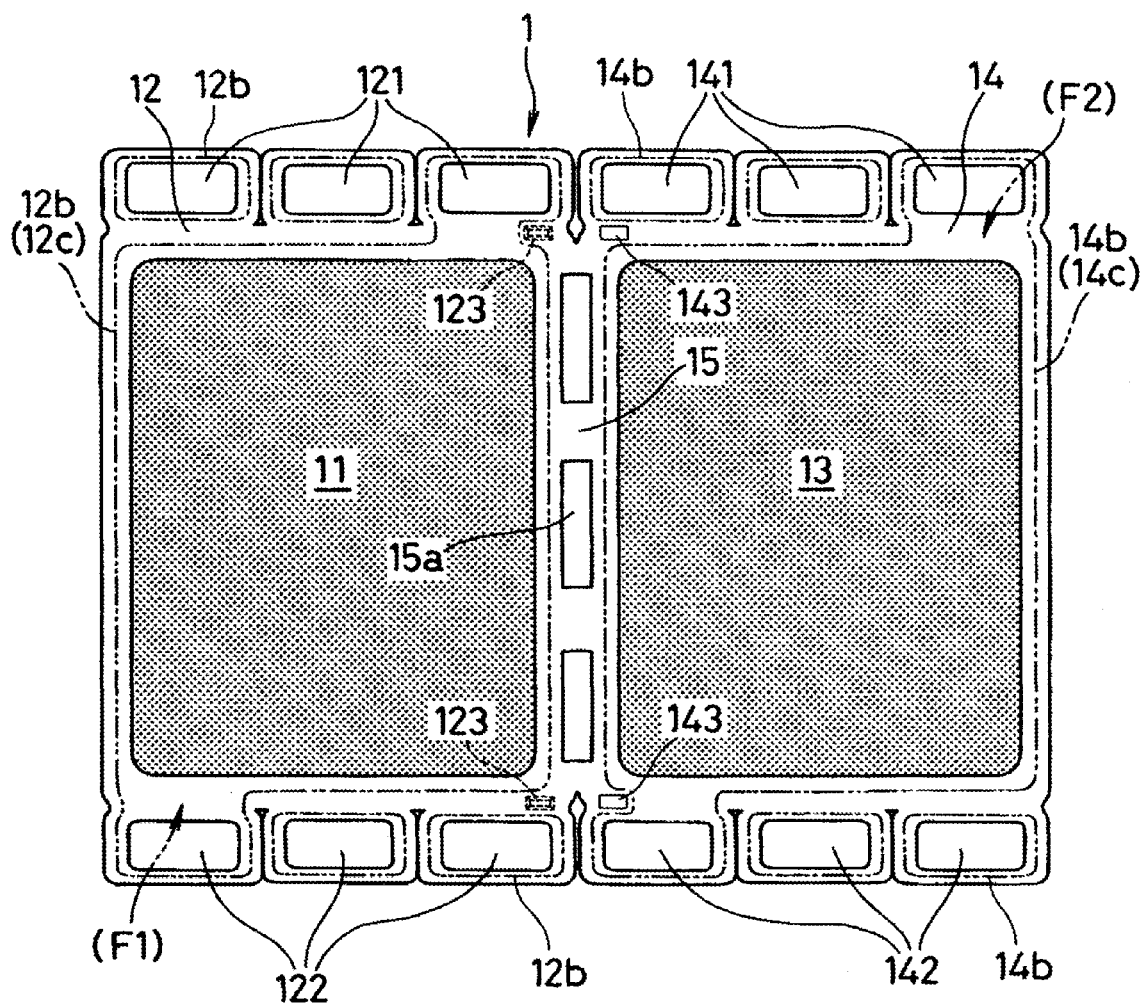
FIG. 12 is a plan view which illustrates a gas diffusion layer-integrated gasket for a fuel cell pertaining to a third embodiment of the present disclosure.

In the third embodiment of the present disclosure shown in FIG. 12, similar to the second embodiment, fitting protrusions 123 on a first gasket 12 and fitting holes 143 on a second gasket 14 are provided near a hinge part 15.

Figure 13:
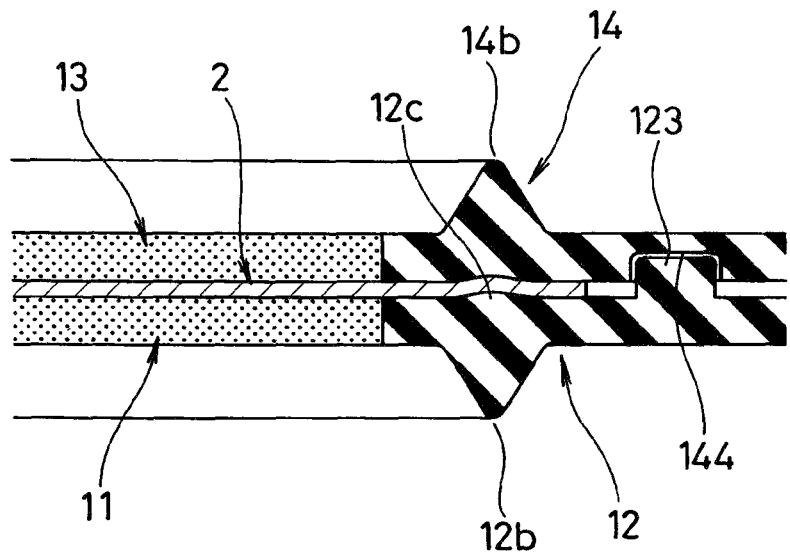
FIG. 13 is a cross-sectional view which illustrates the state of fitting between a fitting protrusion and a fitting indentation of a gas diffusion layer-integrated gasket for a fuel cell pertaining to a fourth embodiment of the present disclosure.

Furthermore, if non-penetrating fitting indentations 144 are formed instead of fitting holes 143 on the second gasket 14 such that these fitting indentations 144 and the fitting protrusions 123 fit together with each other as in the fourth embodiment of the present disclosure shown in FIG. 13, there is no need to be concerned about leakage from these fitting parts, and as a result, there is an increased degree of freedom in determining their shape and position.

Figure 14:
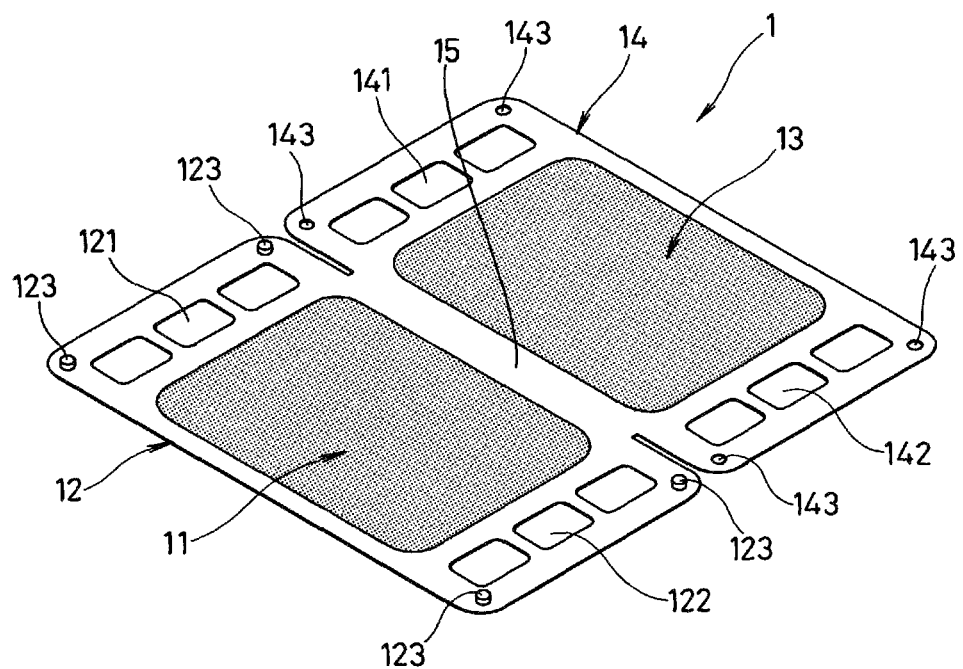
FIG. 14 is a perspective view which illustrates a gas diffusion layer-integrated gasket for a fuel cell pertaining to a fifth embodiment of the present disclosure.

Next, FIG. 14 is a perspective view which illustrates a gas diffusion layer-integrated gasket for a fuel cell pertaining to a fifth embodiment of the present disclosure. In this embodiment, the differences from the third embodiment described above are that fitting protrusions 123 are formed near the four corners of the first gasket 12, and fitting holes 143 are formed near the four corners of the second gasket 14 such that they are symmetrical to the fitting protrusions 123 with the center axis of the hinge part 15 as the axis of symmetry, and also, the fitting protrusions 123 have a round pillar shape, and the shape of the opening of the fitting holes 143 is round. Otherwise, it can be configured basically in the same way as in the second embodiment.

Therefore, the gas diffusion layer-integrated gasket 1 according to this embodiment also exhibits the same effect as the second embodiment.

In this case as well, non-penetrating fitting indentations 144 as shown in FIG. 13 may be formed instead of fitting holes 143.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel cell gas diffusion layer integrated gasket comprising:
    a first gas diffusion layer;
    a first gasket which is integrally formed in the peripheral edge of the first gas diffusion layer;
    a second gas diffusion layer;
    a second gasket which is integrally formed in the peripheral edge of the second gas diffusion layer; and
    a hinge portion which connects the first gasket and the second gasket to each other,
    wherein the first gas diffusion layer and the second gas diffusion layer sandwich a film-electrode complex body having catalyst electrode layers formed on both surfaces of an electrolyte film from both sides, and
    wherein a close contact surface of the first gasket is provided with a seal protrusion which is compressed directly against the film electrode complex body and an entirety of a close contact surface of the second gasket which is compressed directly against the film-electrode complex body opposing the seal protrusion, is planar in an uninstalled condition.

2. The fuel cell gas diffusion layer integrated gasket as claimed in claim 1,
    wherein a fitting protrusion is formed in the first gasket, and a fitting hole or a fitting recess fittable to the fitting protrusion is formed in the second gasket so as to be located at a position symmetrical to the fitting protrusion about the hinge portion as a symmetric axis.

* * * * *